April 9, 1940.  R. T. KINTZING  2,196,418

OVERLOAD PROTECTIVE SCHEME

Filed Dec. 23, 1937

WITNESSES:
H. F. Susser
Nw. C. Groome

INVENTOR
Reese T. Kintzing.
BY
Paul E. Friedemann
ATTORNEY

Patented Apr. 9, 1940

2,196,418

UNITED STATES PATENT OFFICE 2,196,418

OVERLOAD PROTECTIVE SCHEME

Reese T. Kintzing, Wilkinsburg, Pa., assignor to Westinghouse Electric & Manufacturing Company, East Pittsburgh, Pa., a corporation of Pennsylvania Application December 23, 1937, Serial No. 181,352

12 Claims. (Cl. 175—294)

My invention relates to an electric system of control for current consuming devices and more particularly my invention relates to an electric system of control for protecting electric motors which may be subjected to overloads.

In mines as well as many other places where overloads may be frequent, damage may be done to the electric equipment if no provision is made to take the unit causing an overload off the supply circuit. For example, the conditions at a motor operating a sump pump may be such that permanent damage would be done to the motor if an attempt is made to restart it after an overload of the motor.

For applications of the nature mentioned, it is thus frequently very desirable that the motor, after having stopped by reason of a voltage failure, automatically restart, that is, resume operation when the voltage comes back on the supply buses, but it is not desirable that the motor start or even attempt to start if the supply circuit for the motor is interrupted by reason of the operation of the overload protective devices associated with the motor and controller.

One object of my invention is to provide for automatically starting and stopping a motor with a rise and fall of the voltage supplied to the motor but to permanently disconnect the motor from the supply in the event of an overload on the motor.

Another object of my invention is to respectively effect automatic stopping and automatic restarting of an electric device or apparatus with a fall and rise of the voltage of the supply, and for automatically stopping and preventing automatic restarting of the apparatus when the flow of current to the apparatus has exceeded a given value.

A broad object of my invention is to provide an overload protective scheme for an electrical device that is uninfluenced by the rise and fall of the voltage of the energy supplied to the device but is responsive to an overload only.

A more specific object of my invention is the provision of an electric system of control for an electric device using an electric current in which the main switch for connecting the device to a source of electric energy and for disconnecting the device from the source of energy is caused to operate to respectively connect and disconnect the device from the supply with changes in voltage of the supply but in which the main switch is caused to remain open, that is, is caused to permanently disconnect the device from the source of supply after the occurrence of an overload.

Other objects and advantages will become more apparent from a study of the following specification when considered in conjunction with the accompanying drawing, in which.

My system of control and the special relay used with it have general utility, but in the description given hereinafter, other than some of the claims hereto appended, I limit my discussion to my system of control as used with an electric motor driving some useful load (not shown) as for instance, a sump pump.

I am aware of the fact that others have made attempts to solve this problem before me and some of the devices have been partially successful, that is, in a limited way some of the prior art overload devices have given some protection, but with the arrangements of the prior art only too frequently the motor would be reconnected to the supply upon a removal of the overload and in other instances a voltage failure contrary to desired operation would permanently disconnect the motor from the supply, and in still other instances both these defective operations would take place.

With some devices that are to accomplish the desired results my system of control effects, the overload device has to be of special design, the circuit breaker of special design and a special relay having complicated latching devices are necessary.

In my system of control, the overload device remains a conventional device, the circuit breaker need not be modified, nor are complicated latching means needed with a relay and the circuit breaker.

In my system of control I need only four units of which three are conventional or standard while one, an otherwise standard relay, requires some comparatively simple changes. My system of control, since fewer and simple standard units are needed, is thus considerably cheaper and more reliable than systems of control heretofore known.

Figure 4:
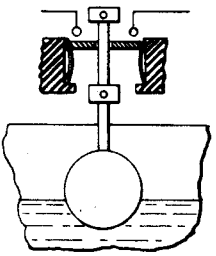
Fig. 4 shows how a switch may be made float actuated.

Briefly, I provide a standard circuit breaker for a motor, a standard overload device which is arranged to open the circuit for the circuit breaker coil, a standard reset push button switch, a special time limit relay and a standard or conventional starting switch, which, for a motor operating a sump pump, may be a float operated switch as shown in Fig. 4.

Figure 1:
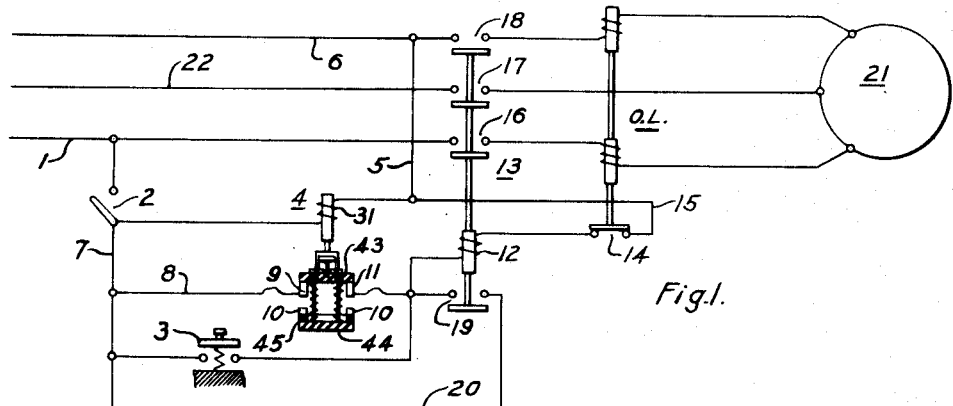
Figure 1 shows a circuit diagram, and a schematically illustrated relay embodying my invention.
Figure 2:
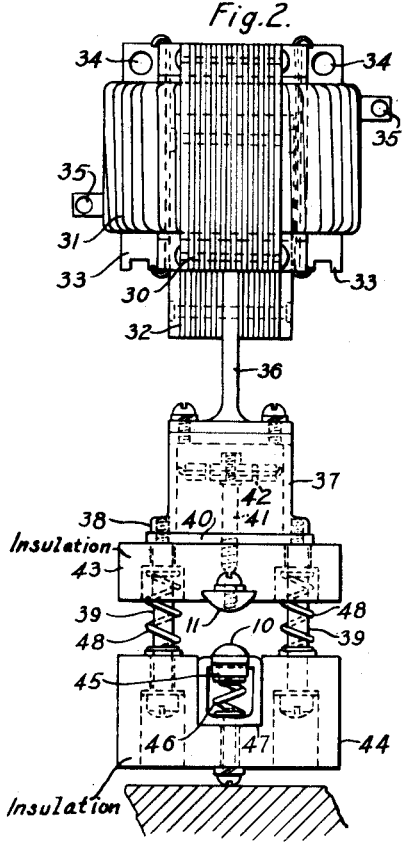
Fig. 2 shows an embodiment of a relay constituting part of my invention.

The relay is the only piece of apparatus used in my system of control that is of non-conventional design. In Fig. 2, I show a relay having a laminated substantially rectangular magnetic circuit 30 having an energizing coil 31 mounted in the rectangular magnetic circuit. The laminated armature 32 is disposed to move centrally of the coil 31 when the coil 31 is energized. The magnetic circuit 30 is provided with the angle pieces 33 at the sides, which angle pieces are provided with apertures 34 for mounting the relay to a suitable base or panel board not shown. The coil 31 has the terminals 35 for connection to a suitable source of supply as for instance the buses 1 and 6 shown in Fig. 1.

One of the laminations, as 36, of the armature 32 is extended so as to carry the switch elements or contact members 9 and 11, and 10 and also to carry the dash pot 37. The dash pot 37 has a flange 38 at the bottom for receiving the stems 39. The stems 39 are screwed into the flange 38 to firmly hold the bottom 40 against the flange to thus form a closure for the dash pot.

The bottom 40 has a central opening for loosely guiding the piston rod 41 carrying the piston 42 of the dash pot 37. A block 43 of insulating material is secured to the lower end of the piston rod 41, is loosely guided on stems 39 and the block carries a pair of switch elements or terminals 9 and 11, which may be connected to control circuits through flexible leads as indicated in Fig. 1.

A block 44 of insulation material is rigidly secured to the bottom of stems 39. This block 44 carries a contact strip 45 to which the terminals 10 are attached. The strip 45 is spring biased by spring 46 to the uppermost position on block 44 against ledges on a U-shaped member 47 held rigidly in block 44. A pair of soft springs 48 are disposed about the stems 39 and normally hold the upper block 43 against the bottom 40, however, when the armature 32 moves vertically upward, which movement will be rather rapid, then the inertia of block 43 and the devices thereto attached causes the terminals 9 and 11 to remain substantially stationary. Since the lower block 44 and the devices carried thereby are connected to the armature 32 and since the piston 42 is free to move downward with reference to the dash pot, contacts 10 are caused to immediately engage contact terminals 9 and 11. After a relatively small but substantially constant time interval after the actuation of armature 32, springs 48 cause block 43 to move against the bottom 40 and in consequence contact members 10 disengage contact terminals 9 and 11.

Figure 3:
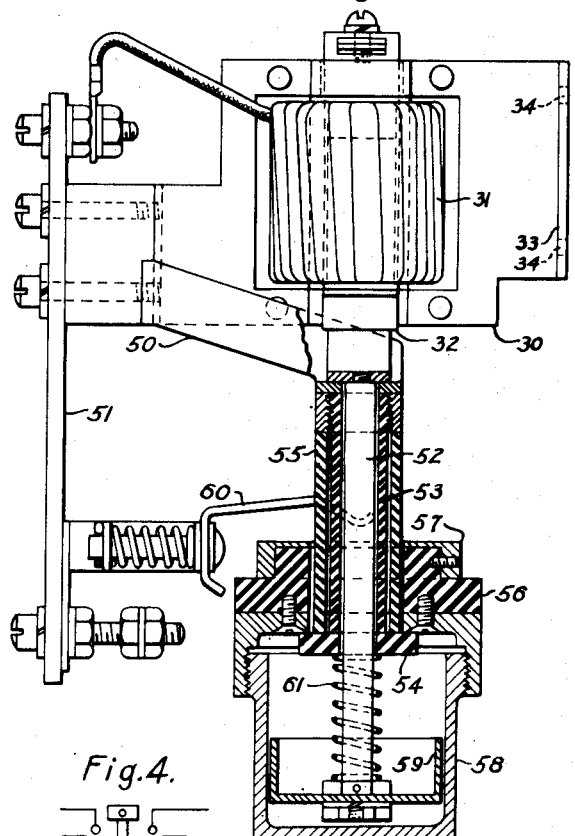
Fig. 3 is a preferred modification of the relay constituting part of my invention.

In the preferred structure shown in Fig. 3, the magnetic circuit is exactly as shown in Fig. 2 but the armature 32 is held in proper relation to the magnetic circuit by a bracket 50 secured to the terminal panel 51 to which the magnetic circuit is also attached.

A piston rod 52 is secured to the armature 32 and is guided in the sleeve 53. The lower end of sleeve 53 carries a stop 54 and this stop rigidly holds the guide 55, of insulating material, between the bracket 50 and the stop 54. A block 56 of insulating material carries a ring 57 of conducting material. The block 56 also carries the dash pot 58. A piston 59, connected to piston rod 52, coacts with the dash pot 58 to thus carry the dash pot 58, block 56 and contact ring 57 with it. In so doing, ring 57 engages the contact 60 resiliently mounted to bias the block toward the stop 54 when engagement is made between ring 57 and the contact 60. After energization of coil 31, a temporary contact is thus made by ring 57 with contact 60 but immediately thereafter block 56 is started toward stop 54 by the resiliently mounted contact 60 and the weight of the block 56 and elements attached thereto complete the movement of block 56 so that the engagement between 57 and 60 is broken and block 56 engages the stop 54. Upon deenergization of coil 31, spring 61 actuates the piston back to the position shown.

A still better understanding of the novel results I obtain with my novel system of control can be had from a study of typical operations.

Assuming that buses 1, 6 and 22 are energized at full voltage and that motor 21 is connected to some useful load as a sump pump and that the starting switch 2, which may be of the type shown in Fig. 4, is operated, then a circuit is established from bus 1 through switch 2, actuating coil 31 of relay 4, and conductor 5 to bus 6.

Energization of coil 31 moves the block 44 upwardly compressing springs 48 because the inertia of the block 43 and the elements thereto attached will cause it to lag behind. As block 43 lags behind, contact members or terminals 9 and 11, and 10 engage each other temporarily to thus establish a circuit from bus 1, through switch 2, conductors 7 and 8, contact members 9, 10 and 11, actuating coil 12 of the circuit breaker 13, contact members 14 of the overload device O. L. and conductor 15 to the energized conductor 5.

Energization of coil 12 causes the operation of the circuit breaker 13 to close the switches 16, 17, 18 and 19. Closure of switches 16, 17 and 18 connects the motor 21 to the buses 1, 6 and 22, and closure of switch 19 establishes a holding circuit for coil 12 through conductor 20 independent of the contacts of relay 4.

A short time after the closure of switches 16, 17, 18 and 19, the springs 48, acting against the restraining force of the dash pot, disengage contacts 10, and 9 and 11. The opening of the circuit at the relay 4 does not affect the operation of the motor 21.

When the sump has been cleared of liquid, the switch 2 opens, coils 31 and 12 become deenergized and relay 4 thus becomes reset automatically to start the motor when switch 2 is again closed.

If the motor be operating normally after having been started, as hereinbefore explained and voltage fails, coils 12 and 31 become insufficiently energized and circuit breaker 13 disconnects the motor from the buses and relay 4 automatically resets itself to again start the motor as soon as full voltage returns on the buses. Voltage failure thus does not permanently stop the operation of the motor, but the motor will start and stop automatically with a rise and fall in supply voltage and will also start and stop automatically with either manual or automatic operation of switch 2.

When an overload occurs, the operation is distinctly different because the overload device automatically opens the circuit for coil 12 but does not affect the energization of coil 31, that is, coil 31 does not become deenergized. The result is that motor 21 is disconnected from the supply but the relay 4 is not automatically reset for restarting of the motor. An overload thus permanently disconnects the motor from the line whereas a failure of voltage disconnects the motor from the line only temporarily, that, is, for the duration of the low voltage.

To still better understand the operation of my device, it should be remembered that relay 4 will have its terminals 9, 11 and 10 in the position shown in Figure 1, both when the coil 31 is energized as well as when it is deenergized. In other words, the circuit through conductor 8 is normally opened and becomes closed only transiently when coil 31 is energized during initial starting or is reenergized after a deenergization because of a voltage failure.

With this in mind, assuming that the circuit breaker 13 is in a circuit closing position and an overload occurs, then contact members 14 are opened, and the coil 12 is deenergized, whereupon the contact members 19 open to thus prevent any further reenergization of coil 12. This is so because a circuit established by the relay 4 for the coil 12 is only a transient circuit and normally the circuit through the conductor 8 is open regardless of whether coil 31 is energized or not. There is thus no reason to suppose that the closing of the contact members 14 causes the closing of the circuit through conductor 8. Whether or not contact members 14 again are closed, the instant the contact members 16, 17 and 18 are opened is immaterial because there is no closed circuit anywhere for coil 12. Any rise in voltage right after the removal of the overload by the opening of the circuit 13 does not affect the relative position of the terminals 9, 11 and 10 since the relative position of these terminals is only altered when relay 4 is deenergized, namely reset and becomes reenergized when voltage is applied to the coil 31.

In industrial applications, where electric power is usually taken from a large power system, many hundreds of motors, such as motor 21 shown in Fig. 1, are connected to a power system so that any overload of one single motor for the entire power system does not affect the voltage regulation to any appreciable extent. It, therefore, follows, in the event of the operation of the overload device and the consequent opening of the motor switch 13, the voltage acting on the coil 31 is not appreciably altered because of the overload, and the disconnection of the motor from the power system. The very negligible voltage drop, due to overload, and the very inconsequential rise of voltage on coil 31 after the breaker 13 opens, cannot appreciably affect the operation of the relay. This becomes even still clearer when it is remembered that electromagnetic devices operating a movable armature normally need a very much smaller current to keep the armature in its actuated position than the current needed to move the armature to its actuated position.

When it is desired to manually restart the motor after an overload stopped the motor, the push button switch 3 is operated. Closure of switch 3 establishes a circuit for coil 12 of the circuit breaker 13 independent of both the relay 4 and the contact members 19.

The disclosure I have made I believe to be merely illustrative of my invention. I, therefore, do not wish to be limited to the details illustrated and described but I wish to be limited only by the claims hereto appended and such prior art as may be pertinent.

I claim as my invention:

1. In an electric system of control, in combination, a source of supply, a relay adapted to be connected to said supply and responsive to the voltage of said supply whereby said relay will automatically reciprocate with a rise and fall in the voltage of said supply, said relay having switching means which close for a relatively short substantially predetermined interval of time when the relay operates in one direction because of a predetermined rise in the voltage supplied to it, a current consuming device, means responsive to the closure of the switching means of the relay adapted to connect said current consuming device to said source of supply, and means responsive to a current above a given value adapted to disconnect said current consuming device from said supply.

2. In a system of control for a current consuming device, in combination, a source of electrical energy, a current consuming device, a main electromagnetically operable switch for connecting said current consuming device to said source of energy, switching means responsive to the voltage of said source of energy adapted to automatically effect the opening of said main switch upon a predetermined decrease in voltage of said source of energy and to automatically produce a transient energizing circuit for the main switch to effect the closing of said main switch upon a predetermined rise in voltage of said source of energy and control means responsive to the operation of the main switch adapted to maintain said main switch closed, means responsive to a predetermined current value drawn by said current consuming device adapted to control said main switch so as to deenergize said current consuming device and to render said main switch inoperative, said control means including means adapted to maintain said main switch in open position after having been caused to open by said control means.

3. In a system of control for a current consuming device, in combination, a source of electrical energy, a current consuming device, an electromagnetically operable main switch for connecting the device to the source of energy, switching means responsive to the voltage of said source of energy adapted to automatically provide a transient energizing circuit for the main switch to effect the closing and the opening of said main switch upon a predetermined variation in voltage of said source of energy, means for providing a permanent energizing circuit for said main switch in parallel to the transient energizing circuit, and control means responsive to a predetermined current value drawn by said current consuming device adapted to control said main switch so as to deenergize said current consuming device and to render said main switch inoperative.

4. In a system of control for a current consuming device, in combination, a source of electric energy, a current consuming device, a main switch for connecting said current consuming device to said source of energy, automatically operable switching means responsive to a predetermined voltage of said source of energy adapted to automatically temporarily establish an energizing circuit connection for said main switch to effect the connection of said current consuming device to the said source of electric energy and responsive to a lower voltage than said predetermined voltage adapted to automatically cause the operation of said main switch to disconnect said current consuming device from said source of energy, means responsive to the operation of the main switch to provide a permanent circuit connection for said main switch and means responsive to a predetermined load current of said current consuming device adapted to control said main switch so as to permanently disconnect said current consuming device from said source of electric energy to thus prevent automatic reenergization of said current consuming device after the overload is discontinued.

5. In a system of control for a current consuming device, in combination, a source of electric energy, a relay having switching means which temporarily close when said relay is energized, a switch for connecting said relay to said source of energy whereby said relay is responsive to the voltage of said source of energy and thus repeatedly temporarily closes its switching means at each rise in voltage of the source of supply above a predetermined value, a current consuming device, electromagnetic switching means responsive to the operation of the relay switching means adapted to connect said current consuming device to said source of electric energy and to provide for energization of said electromagnetic switching means independent of said relay, and means responsive to an overload drawn by said current consuming device adapted to deenergize said second named switching means.

6. In a system of control for a current consuming device, in combination, a source of electric energy, a relay having an actuating coil connected to said source and to thus be responsive to the variations in voltage of said source, said relay having switch elements which are caused to close immediately after the energization of said relay, but said switch elements have time limit means associated therewith to cause said switch elements to automatically open after a predetermined interval of time even though the relay remains energized, a current consuming device, a main switch adapted to be operated by said switch elements, said main switch having a holding circuit whereby it remains energized independent of the switch elements of the relay and means responsive to an overload of the current consuming device for deenergizing the main switch.

7. In a system of control for a current consuming device, in combination, a source of electric energy, a current consuming device, an electro-magnetically operable main switch having a coil which, when energized, causes the closing of said switch to thus connect said current consuming device to said source of energy, a voltage responsive relay, connected to be responsive to the voltage of said source, adapted to cause a transient closing of the circuit for the coil of said main switch to thus cause the energization of said coil, and means responsive to a given load current of the current consuming device adapted to permanently deenergize the coil of the main switch.

8. In a system of control for a current consuming device, in combination, an electromagnetically operable contactor having a coil which, when energized operates the contactor, a pair of switching means disposed in parallel circuits one of said switching means being operable for a transient closure upon operation thereof and the other switching means being part of the contactor and thus adapted to remain closed as long as the contactor is in operated position, a current responsive device having switching means in series with said contactor coil and adapted to open the circuit of said coil upon being subjected to a given load current, said parallelly connected switching means being connected in series with the series connected coil and current responsive switching means.

9. In a system of control, in combination, a pair of parallelly connected normally open switches, a contactor coil and a normally closed current responsive switch connected in series with each other and connected in series with the parallelly connected switches, one of said switches being adapted for a transient closure to thus energize the contactor coil and the other switch adapted to be closed by the energization of the coil, whereby opening of the current responsive switch effects a permanent opening of the circuit of the contactor coil.

10. In a system of control, in combination, a normally open switch, a voltage responsive device adapted to transiently close said normally open switch, a coil disposed to be energized by the transient closure of the normally open switch, a switch operable by the coil adapted to close a circuit in parallel with said normally open switch while the switch is transiently closed to thus maintain said coil energized, and a current responsive switch in series with the coil adapted to open the circuit of the coil upon being energized by a current of a given value.

11. In a system of control, in combination, a current consuming device, a normally open switch, a voltage responsive device adapted to transiently close said normally open switch, a coil disposed to be energized by the transient closure of the normally open switch, a switch operable by the coil adapted to close a circuit in parallel with said normally open switch while the switch is transiently closed to thus maintain said coil energized, and a second switch also operable by the coil to close a circuit for the current consuming device, and a current responsive switch responsive to the current of the current consuming device and disposed in series with the coil adapted to open the circuit of the coil upon being energized by a current of a given value.

12. In a system of control, in combination, a source of energy, a current consuming device, an electromagnetically operable main switch adapted, when energized, to connect the current consuming device to said source, an electromagnetic relay adapted to produce a transient energizing circuit for the main switch, means responsive to the operation of the main switch adapted to maintain the main switch energized after the transient energization is ended, and means responsive to the load current of the current consuming device to open the energizing circuit for the main switch and thus also the switch adapted to maintain the main switch energized.

REESE T. KINTZING.